US009883357B2

(12) United States Patent
Kundu et al.

(10) Patent No.: US 9,883,357 B2
(45) Date of Patent: Jan. 30, 2018

(54) RADIO ACCESS NETWORK (RAN) AWARE SERVICE DELIVERY FOR PUSH-TO-TALK-OVER-CELLULAR (PoC) NETWORKS

(71) Applicant: Kodiak Networks Inc., Plano, TX (US)

(72) Inventors: Gorachand Kundu, Bangalore (IN); Brahmananda R. Vempati, Dallas, TX (US); Krishnakant M. Patel, Richardson, TX (US); Ravi Ayyasamy, Richardson, TX (US); Ramu Kandula, Plano, TX (US); Harisha M. Negaluguli, Richardson, TX (US)

(73) Assignee: KODIAK NETWORKS, INC., Plano, TX (US)

( * ) Notice: Subject to any disclaimer, the term of this patent is extended or adjusted under 35 U.S.C. 154(b) by 14 days.

(21) Appl. No.: 15/205,931

(22) Filed: Jul. 8, 2016

(65) Prior Publication Data

US 2016/0323721 A1   Nov. 3, 2016

Related U.S. Application Data

(63) Continuation-in-part of application No. 15/004,645, filed on Jan. 22, 2016, which is a continuation of
(Continued)

(51) Int. Cl.
| H04B 7/00 | (2006.01) |
| H04W 4/10 | (2009.01) |
| H04M 3/42 | (2006.01) |
| H04M 3/56 | (2006.01) |
| H04W 4/02 | (2009.01) |

(Continued)

(52) U.S. Cl.
CPC ......... *H04W 4/10* (2013.01); *H04M 3/42374* (2013.01); *H04M 3/561* (2013.01); *H04W 4/023* (2013.01); *H04W 4/08* (2013.01); *H04W 76/005* (2013.01); *H04L 67/24* (2013.01); *H04W 4/06* (2013.01)

(58) Field of Classification Search
CPC ..... H04W 4/08; H04W 76/005; H04W 4/023; H04W 4/10; H04W 4/06; H04L 65/4061; H04L 67/24; H04M 3/561; H04M 3/42374
USPC ......................................... 455/518; 370/338
See application file for complete search history.

(56) References Cited

U.S. PATENT DOCUMENTS

| 7,961,667 B2 * | 6/2011 | Perzy ................. H04L 12/1822 370/328 |
| 2006/0031368 A1 * | 2/2006 | deCone ................. G06F 9/546 709/207 |

(Continued)

*Primary Examiner* — Marcos Batista
(74) *Attorney, Agent, or Firm* — Slater Matsil, LLP

(57) ABSTRACT

A system and method for providing radio access network (RAN) aware service delivery for Push-to-talk-over-Cellular (PoC) networks, wherein at least one of the servers performs an presence delivery method that reduces presence notifications delivered to the mobile units participating in communications services. The effective presence delivery method may comprise: throttling the delivery of the presence notifications; avoiding simultaneous dispatch of the presence notifications to multiple watchers located in the same cell or group of cells of the wireless communications network; or the server delaying sending the presence notifications for a mobile unit until the mobile unit triggers the server.

23 Claims, 5 Drawing Sheets

Related U.S. Application Data application No. PCT/US2014/047863, filed on Jul. 23, 2014, said application No. 15/205,931 is a continuation of application No. PCT/US2015/010617, filed on Jan. 8, 2015.

(60) Provisional application No. 61/857,363, filed on Jul. 23, 2013, provisional application No. 61/944,168, filed on Feb. 25, 2014, provisional application No. 61/924,897, filed on Jan. 8, 2014.

(51) Int. Cl.
| | | |
|---|---|---|
| *H04W 4/08* | (2009.01) | |
| *H04W 76/00* | (2009.01) | |
| *H04L 29/08* | (2006.01) | |
| *H04W 4/06* | (2009.01) | |

(56) References Cited

U.S. PATENT DOCUMENTS

| | | |
|---|---|---|
| 2006/0079244 A1 | 4/2006 | Posner et al. |
| 2006/0286993 A1 | 12/2006 | Xie et al. |
| 2008/0155689 A1 | 6/2008 | Denninghoff |
| 2008/0161062 A1 | 7/2008 | Harris et al. |
| 2008/0183866 A1* | 7/2008 | Maeda .................... H04L 67/24 709/224 |
| 2010/0195554 A1 | 8/2010 | Song et al. |
| 2012/0170352 A1 | 7/2012 | Le Neel et al. |
| 2012/0278490 A1 | 11/2012 | Sennett et al. |
| 2013/0155875 A1 | 6/2013 | Ayyasamy et al. |

\* cited by examiner

RADIO ACCESS NETWORK (RAN) AWARE SERVICE DELIVERY FOR PUSH-TO-TALK-OVER-CELLULAR (POC) NETWORKS

PRIORITY CLAIM AND CROSS-REFERENCE

This application is a continuation-in-part of application Ser. No. 15/004,645, filed on Jan. 22, 2016, entitled "Effective Presence for Push-to-Talk-Over-Cellular (PoC) Networks," which is a continuation of PCT/US2014/047863, filed on Jul. 23, 2014, which claims the benefit of U.S. Provisional Application Ser. No. 61/857,363, filed Jul. 23, 2013, entitled "EFFECTIVE PRESENCE FOR PUSH-TO-TALK-OVER-CELLULAR (PoC) NETWORKS," and of U.S. Provisional Application Ser. No. 61/944,168, filed Feb. 25, 2014, entitled "EFFECTIVE PRESENCE FOR PUSH-TO-TALK-OVER-CELLULAR (PoC) NETWORKS," which applications are incorporated by reference herein.

This application is a continuation of and claims the benefit of P.C.T. Application No. PTC/US2015/10617, entitled "Optimized Methods for Large Group Calling Using Unicast and Multicast Transport Bearers for Push-to-Talk-over-Cellular (PoC)," filed on 8 Jan. 2015 which application claims the benefit of U.S. Provisional Application No. 61/924,897, entitled "Optimized Methods for Large Group Calling Using Unicast and Multicast Transport Bearer for Push-to-Talk-over-Cellular (PoC)," filed on 8 Jan. 2014, which applications are hereby incorporated herein by reference.

This application is related to the following commonly-assigned patent applications:

U.S. Utility application Ser. No. 10/515,556, filed Nov. 23, 2004, by Gorachand Kundu, Ravi Ayyasamy and Krishnakant Patel, entitled "DISPATCH SERVICE ARCHITECTURE FRAMEWORK,", now U.S. Pat. No. 7,787,896, issued Aug. 31, 2010, which application claims the benefit under 35 U.S.C. Section 365 of P.C.T. International Application Serial Number PCT/US03/16386, which application claims the benefit under 35 U.S.C. Section 119(e) of U.S. Provisional Application Ser. Nos. 60/382,98160/383,179 and 60/407,168 ;

U.S. Utility application Ser. No. 10/564,903, filed Jan. 17, 2006, by F. Craig Farrill, Bruce D. Lawler and Krishnakant M. Patel, entitled "PREMIUM VOICE SERVICES FOR WIRELESS COMMUNICATIONS SYSTEMS," attorney docket number G&C 154.7-US-WO, which application claims the benefit under 35 U.S.C. Section 365 of P.C.T. International Application Serial Number PCT/US04/23038, which application claims the benefit under 35 U.S.C. Section 119(e) of U.S. Provisional Application Ser. Nos. 60/488,638, 60/492,650 and 60/576,094 and which application is a continuation-in-part and claims the benefit under 35 U.S.C. Sections 119, 120 and/or 365 of P.C.T. International Application Serial Number PCT/US03/16386;

U.S. Utility application Ser. No. 11/126,587, filed May 11, 2005, by Ravi Ayyasamy and Krishnakant M. Patel, entitled "ARCHITECTURE, CLIENT SPECIFICATION AND APPLICATION PROGRAMMING INTERFACE (API) FOR SUPPORTING ADVANCED VOICE SERVICES (AVS) INCLUDING PUSH TO TALK ON WIRELESS HANDSETS AND NETWORKS," attorney docket number 154.9-US-U1, now U.S. Pat. No. 7,738,892, issued Jun. 15, 2010, which application claims the benefit under 35 U.S.C. Section 119(e) of U.S. Provisional Application Ser. Nos. 60/569,953 and 60/579,309, and which application is a continuation-in-part and claims the benefit under 35 U.S.C. Sections 119, 120 and/or 365 of U.S. Utility application Ser. No. 10/515,556 and P.C.T. International Application Serial Number PCT/US04/23038 ;

U.S. Utility application Ser. No. 11/129,268, filed May 13, 2005, by Krishnakant M. Patel, Gorachand Kundu, Ravi Ayyasamy and Basem Ardah, entitled "ROAMING GATEWAY FOR SUPPORT OF ADVANCED VOICE SERVICES WHILE ROAMING IN WIRELESS COMMUNICATIONS SYSTEMS,", now U.S. Pat. No. 7,403,775, issued Jul. 22, 2008, which application claims the benefit under 35 U.S.C. Section 119(e) of U.S. Provisional Application Ser. No. 60/571,075, and which application is a continuation-in-part and claims the benefit under 35 U.S.C. Sections 119, 120 and/or 365 of U.S. Utility application Ser. No. 10/515,556 and P.C.T. International Application Serial Number PCT/US04/23038;

U.S. Utility application Ser. No. 11/134,883, filed May 23, 2005, by Krishnakant Patel, Vyankatesh V. Shanbhag, Ravi Ayyasamy, Stephen R. Horton and Shan-Jen Chiou, entitled "ADVANCED VOICE SERVICES Architecture Framework,"now U.S. Pat. No. 7,764,950, issued Jul. 27, 2010, which application claims the benefit under 35 U.S.C. Section 119(e) of U.S. Provisional Application Ser. Nos. 60/573,059 and 60/576,092, and which application is a continuation-in-part and claims the benefit under 35 U.S.C. Sections 119, 120 and/or 365 of U.S. Utility application Ser. No. 10/515,556, P.C.T. International Application Serial Number PCT/US04/23038, U.S. Utility application Ser. No. 11/126,587, and U.S. Utility application Ser. No. 11/129, 268, U.S. Utility application Ser. No. 11/136,233, filed May 24, 2005, by Krishnakant M. Patel, Vyankatesh Vasant Shanbhag, and Anand Narayanan, entitled "SUBSCRIBER IDENTITY MODULE (SIM) ENABLING ADVANCED VOICE SERVICES (AVS) INCLUDING PUSH-TO-TALK, PUSH-TO-CONFERENCE AND PUSH-TO-MESSAGE ON WIRELESS HANDSETS AND NETWORKS," attorney docket number 154.13-US-U1, now U.S. Pat. No. 7,738,896, issued Jun. 15, 2010, which application claims the benefit under 35 U.S.C. Section 119(e) of U.S. Provisional Application Ser. No. 60/573,780, and which application is a continuation-in-part and claims the benefit under 35 U.S.C. Sections 119, 120 and/or 365 of U.S. Utility application Ser. No. 10/515,556, P.C.T. International Application Serial Number PCT/US04/23038, U.S. Utility application Ser. No. 11/126,587, and U.S. Utility application Ser. No. 11/134,883;

U.S. Utility application Ser. No. 11/158,527, filed Jun. 22, 2005, by F. Craig Farrill, entitled "PRESS-TO-CONNECT FOR WIRELESS COMMUNICATIONS SYSTEMS," now U.S. Pat. No. 7,529,557, issued May 5, 2009, which application claims the benefit under 35 U.S.C. Section 119(e) of U.S. Provisional Application Ser. No. 60/581,954, and which application is a continuation-in-part and claims the benefit under 35 U.S.C. Sections 119, 120 and/or 365 of U.S. Utility application Ser. No. 10/515,556 and P.C.T. International Application Serial Number PCT/US04/23038;

U.S. Utility application Ser. No. 11/183,516, filed Jul. 18, 2005, by Deepankar Biswaas, entitled "VIRTUAL PUSH TO TALK (PTT) AND PUSH TO SHARE (PTS) FOR WIRELESS COMMUNICATIONS SYSTEMS,"which application claims the benefit under 35 U.S.C. Section 119(e) of U.S. Provisional Application Ser. No. 60/588,464;

U.S. Utility application Ser. No. 11/356,775, filed Feb. 17, 2006, by Krishnakant M. Patel, Bruce D. Lawler, Giridhar K. Boray, and Brahmananda R. Vempati, entitled "ENHANCED FEATURES IN AN ADVANCED VOICE SERVICES (AVS) FRAMEWORK FOR WIRELESS COMMUNICATIONS SYSTEMS," now U.S. Pat. No. 7,813,722, issued Oct. 12, 2010, which application claims the benefit under 35 U.S.C. Section 119(e) of U.S. Provisional Application Ser. No. 60/654,271;

P.C.T. International Application Serial Number PCT/US2006/011628, filed Mar. 30, 2006, by Krishnakant M. Patel, Gorachand Kundu, Sameer Dharangaonkar, Giridhar K. Boray, and Deepankar Biswas, entitled "TECHNIQUE FOR IMPLEMENTING ADVANCED VOICE SERVICES USING AN UNSTRUCTURED SUPPLEMENTARY SERVICE DATA (USSD) INTERFACE," which application claims the benefit under 35 U.S.C. Section 119(e) of U.S. Provisional Application Ser. No. 60/666,424;

U.S. Utility application Ser. No. 11/462,332, filed Aug. 3, 2006, by Deepankar Biswas, Krishnakant M. Patel, Giridhar K. Boray, and Gorachand Kundu, entitled "ARCHITECTURE AND IMPLEMENTATION OF CLOSED USER GROUP AND LIMITING MOBILITY IN WIRELESS NETWORKS," now U.S. Pat. No. 7,689,238, issued Mar. 30, 2010, which application claims the benefit under 35 U.S.C. Section 119(e) of U.S. Provisional Application Ser. No. 60/705,115;

U.S. Utility application Ser. No. 11/463,186, filed Aug. 8, 2006, by Ravi Ayyasamy and Krishnakant M. Patel, entitled "ADVANCED VOICE SERVICES CLIENT FOR BREW PLATFORM," now U.S. Pat. No. 8,036,692, issued Oct. 11, 2011, which application claims the benefit under 35 U.S.C. Section 119(e) of U.S. Provisional Application Ser. No. 60/706,265;

U.S. Utility application Ser. No. 11/567,098, filed Dec. 5, 2006, by Ravi Ayyasamy, Bruce D. Lawler, Krishnakant M. Patel, Vyankatesh V. Shanbhag, Brahmananda R. Vempati, and Ravi Shankar Kumar, entitled "INSTANT MESSAGING INTERWORKING IN AN ADVANCED VOICE SERVICES (AVS) FRAMEWORK FOR WIRELESS COMMUNICATIONS SYSTEMS," which application claims the benefit under 35 U.S.C. Section 119(e) of U.S. Provisional Application Ser. No. 60/742,250;

U.S. Utility application Ser. No. 11/740,805, filed Apr. 26, 2007, by Krishnakant M. Patel, Giridhar K. Boray, Ravi Ayyasamy, and Gorachand Kundu, entitled "ADVANCED FEATURES ON A REAL-TIME EXCHANGE SYSTEM," now U.S. Pat. No. 7,853,279, issued Dec. 14, 2010, which application claims the benefit under 35 U.S.C. Section 119(e) of U.S. Provisional Application Ser. No. 60/795,090;

U.S. Utility application Ser. No. 11/891,127, filed Aug. 9, 2007, by Krishnakant M. Patel, Deepankar Biswas, Sameer P. Dharangaonkar and Terakanambi Nanjanayaka Raja, entitled "EMERGENCY GROUP CALLING ACROSS MULTIPLE WIRELESS NETWORKS," which application claims the benefit under 35 U.S.C. Section 119(e) of U.S. Provisional Application Ser. No. 60/836,521;

U.S. Utility application Ser. No. 12/259,102, filed on Oct. 27, 2008, by Krishnakant M. Patel, Gorachand Kundu, and Ravi Ayyasamy, entitled "CONNECTED PORTFOLIO SERVICES FOR A WIRELESS COMMUNICATIONS NETWORK," which application claims the benefit under 35 U.S.C. Section 119(e) of U.S. Provisional Application Ser. Nos. 60/982,650 and 61/023,042;

U.S. Utility application Ser. No. 12/359,861, filed on Jan. 26, 2009, by Bruce D. Lawler, Krishnakant M. Patel, Ravi Ayyasamy, Harisha Mahabaleshwara Negalaguli, Binu Kaiparambil, Shiva Cheedella, Brahmananda R. Vempati, Ravi Shankar Kumar, and Avrind Shanbhag, entitled "CONVERGED MOBILE-WEB COMMUNICATIONS SOLUTION," now U.S. Pat. No. 8,676,189, issued Mar. 18, 2014, which application claims the benefit under 35 U.S.C. Section 119(e) of U.S. Provisional Application Ser. No. 61/023,332;

U.S. Utility application Ser. No. 12/582,601, filed Oct. 20, 2009, by Krishnakant M. Patel, Ravi Ayyasamy, Gorachand Kundu, Basem A. Ardah, Anand Narayanan, Brahmananda R. Vempati, and Pratap Chandana, entitled "HYBRID PUSH-TO-TALK FOR MOBILE PHONE NETWORKS," which application claims the benefit under 35 U.S.C. Section 119(e) of U.S. Provisional Application Ser. No. 61/106,689;

U.S. Utility application Ser. No. 12/781,566, filed on May 17, 2010, by Bruce D. Lawler, Krishnakant M. Patel, Ravi Ayyasamy, Harisha Mahabaleshwara Negalaguli, Binu Kaiparambil, Shiva K. K. Cheedella, Brahmananda R. Vempati, and Ravi Shankar Kumar, entitled "CONVERGED MOBILE-WEB COMMUNICATIONS SOLUTION," now U.S. Pat. No. 8,670,760, issued Mar. 11, 2014, which application is a continuation-in-part and claims the benefit under 35 U.S.C. Sections 119, 120 and/or 365 of U.S. Utility application Ser. No. 12/582,601;

U.S. Utility application Ser. No. 12/750,175, filed on Mar. 30, 2010, by Bruce D. Lawler, Krishnakant M. Patel, Ravi Ayyasamy, Harisha Mahabaleshwara Negalaguli, Basem A. Ardah, Gorachund Kundu, Ramu Kandula, Brahmananda R. Vempati, Ravi Shankar Kumar, Chetal M. Patel, and Shiva K. K. Cheedella, entitled "ENHANCED GROUP CALLING FEATURES FOR CONNECTED PORTFOLIO SERVICES IN A WIRELESS COMMUNICATIONS NETWORK," now U.S. Pat. No. 8,498,660, issued Jul. 30, 2013, which application claims the benefit under 35 U.S.C. Section 119(e) of U.S. Provisional Application Ser. Nos. 61/164,754 and 61/172,129;

U.S. Utility application Ser. No. 12/961,419, filed Dec. 6, 2010, by Ravi Ayyasamy, Bruce D. Lawler, Brahmananda R. Vempati, Gorachand Kundu and Krishnakant M. Patel, entitled "COMMUNITY GROUP CLIENT AND COMMUNITY AUTO DISCOVERY SOLUTIONS IN A WIRELESS COMMUNICATIONS NETWORK," which application claims the benefit under 35 U.S.C. Section 119(e) of U.S. Provisional Application Ser. No. 61/266,896;

U.S. Utility Application Ser. No. 13/039,635, filed on Mar. 3, 2011, by Narasimha Raju Nagubhai, Ravi Shankar Kumar, Krishnakant M. Patel, and Ravi Ayyasamy, entitled "PREPAID BILLING SOLUTIONS FOR PUSH-TO-TALK IN A WIRELESS COMMUNICATIONS NETWORK,", now U.S. Pat. No. 8,369,829, issued Feb. 5, 2013, which application claims the benefit under 35 U.S.C. Section 119(e) of U.S. Provisional Application Ser. No. 61/310,245;

U.S. Utility application Ser. No. 13/093,542, filed Apr. 25, 2011, by Brahmananda R. Vempati, Krishnakant M. Patel, Pratap Chandana, Anand Narayanan, Ravi Ayyasamy, Bruce D. Lawler, Basem A. Ardah, Ramu Kandula, Gorachand Kundu, Ravi Shankar Kumar, and Bibhudatta Biswal, and entitled "PREDICTIVE WAKEUP FOR PUSH-TO-TALK-OVER-CELLULAR (PoC) CALL SETUP OPTIMIZATIONS," now U.S. Pat. No. 8,478,261, issued Jul. 2, 2013, which application claims the benefit under 35 U.S.C. Section 119(e) of U.S. Provisional Application Ser. No. 61/347,217, filed May 21, 2010, by Brahmananda R. Vempati, Krishnakant M. Patel, Pratap Chandana, Anand Narayanan, and Ravi Ayyasamy, entitled "PREDICTIVE WAKEUP FOR PUSH-TO-TALK-OVER-CELLULAR (PoC) CALL SETUP OPTIMIZATIONS,";

U.S. Utility application Ser. No. 13/710,683, filed Dec. 11, 2012, by Ravi Ayyasamy, Gorachand Kundu, Krishnakant M. Patel, Brahmananda R. Vempati, Harisha M. Negalaguli, Shiva K. K. Cheedella, Basem A. Ardah, Ravi Shankar Kumar, Ramu Kandula, Arun Velayudhan, Shibu Narendranathan, Bharatram Setti, Anand Narayanan, and Pratap Chandana, entitled "PUSH-TO-TALK-OVER-CELLULAR (PoC),", , which application claims the benefit under 35 U.S.C. Section 119(e) of U.S. Provisional Application Ser. No. 61/570,694, filed Dec. 14, 2011, by Ravi Ayyasamy, Gorachand Kundu, Krishnakant M. Patel, Brahmananda R. Vempati, Harisha Mahabaleshwara Negalaguli, Shiva Koteshwara Kiran Cheedella, Basem A. Ardah, Ravi Shankar Kumar, Ramu Kandula, Arun Velayudhan, Shibu Narendranathan, Bharatram Setti, Anand Narayanan, and Pratap Chandana, entitled "PUSH-TO-TALK-OVER-CELLULAR (PoC),";

U.S. Utility application Ser. No. 13/917,561, filed Jun. 13, 2013, by Krishnakant M. Patel, Brahmananda R. Vempati, Anand Narayanan, Gregory J. Morton, and Ravi Ayyasamy, entitled "RUGGEDIZED CASE OR SLEEVE FOR PROVIDING PUSH-TO-TALK (PTT) FUNCTIONS,", which application claims the benefit under 35 U.S.C. Section 119(e) of U.S. Provisional Application Ser. No. 61/659,292, filed Jun. 13, 2012, by Krishnakant M. Patel, Brahmananda R. Vempati, Anand Narayanan, and Gregory J. Morton, entitled "PUSH-TO-TALK CASE OR SLEEVE FOR CONVERTING GENERIC DEVICES TO FUNCTION LIKE PURPOSE-BUILT PUSH-TO-TALK DEVICES,"; U.S. Provisional Application Ser. No. 61/682,524, filed Aug. 13, 2012, by Krishnakant M. Patel, Brahmananda R. Vempati, Anand Narayanan, and Gregory J. Morton, entitled "RUGGEDIZED PUSH-TO-TALK (PTT) CASE,"; and U.S. Provisional Application Ser. No. 61/705,748, filed Sep. 26, 2012, by Krishnakant M. Patel, Brahmananda R. Vempati, Anand Narayanan, Gregory J. Morton, and Ravi Ayyasamy, entitled "PUSH-TO-TALK CASE OR SLEEVE FOR CONVERTING GENERIC DEVICES TO FUNCTION LIKE PURPOSE-BUILT PUSH-TO-TALK DEVICES,"; and U.S. Utility application Ser. No. 13/757,520, filed Feb. 1, 2013, by Krishnakant M. Patel, Harisha Mahabaleshwara Negalaguli, Brahmananda R. Vempati, Shiva Koteshwara Kiran Cheedella, Arun Velayudhan, Raajeev Kuppa, Gorachand Kundu, Ravi Ganesh Ramamoorthy, Ramu Kandula, Ravi Ayyasamy, and Ravi Shankar Kumar, entitled "WiFi INTERWORKING SOLUTIONS FOR PUSH-TO-TALK-OVER-CELLULAR (PoC),", which application claims the benefit under 35 U.S.C. Section 119(e) of U.S. Provisional Application Ser. No. 61/593,485, filed Feb. 1, 2012, by Krishnakant M. Patel, Harisha Mahabaleshwara Negalaguli, Brahmananda R. Vempati, Shiva Koteshwara Kiran Cheedella, Arun Velayudhan, Raajeev Kuppa, and Gorachand Kundu, entitled "WiFi INTERWORKING SOLUTIONS FOR PUSH-TO-TALK OVER CELLULAR (PoC) IN THE OPEN MOBILE ALLIANCE (OMA) STANDARD,";

U.S. Utility application Ser. No. 14/093,240, filed Nov. 29, 2013, by Gorachand Kundu, Krishnakant M. Patel, Harisha Mahabaleshwara Negalaguli, Ramu Kandula, and Ravi Ayyasamy, entitled "METHOD AND FRAMEWORK TO DETECT SERVICE USERS IN INSUFFICIENT WIRELESS RADIO COVERAGE NETWORK AND IMPROVE SERVICE DELIVERY EXPERIENCE BY GUARANTEED PRESENCE," attorneys', which application claims the benefit under 35 U.S.C. Section 119(e) of U.S. Provisional Application Ser. No. 61/730,856, filed Nov. 28, 2012, by Gorachand Kundu, Krishnakant M. Patel, Harisha Mahabaleshwara Negalaguli, Ramu Kandula, and Ravi Ayyasamy, entitled "METHOD AND FRAMEWORK TO DETECT SERVICE USERS IN INSUFFICIENT WIRELESS RADIO COVERAGE NETWORK AND IMPROVE SERVICE DELIVERY EXPERIENCE BY GUARANTEED PRESENCE,";

P.C.T. International Application Serial Number PCT/US2014/036414, filed May 1, 2014, by Krishnakant M. Patel, Harisha Mahabaleshwara Negalaguli, Arun Velayudhan, Ramu Kandula, Syed Nazir Khadar, Shiva Koteshwara Kiran Cheedella, and Subramanyam Narasimha Prashanth, entitled "VOICE-OVER-IP (VOIP) DENIAL OF SERVICE (DOS) PROTECTION MECHANISMS FROM ATTACK,", which application claims the benefit under 35 U.S.C. Section 119(e) of U.S. Provisional Application Ser. No. 61/818,109, filed May 1, 2013, by Harisha M. Negalaguli, Krishnakant M. Patel, Arun Velayudhan, Ramu Kandula, Syed N. Khadar, and Subramanyam N. Prashanth, entitled "VOICE-OVER-IP (VOIP) DENIAL OF SERVICE (DOS) PROTECTION MECHANISMS,"; and U.S. Provisional Application Ser. No. 61/821,975, filed May 10, 2013, by Krishnakant M. Patel, Harisha M. Negalaguli, Arun Velayudhan, and Ramu Kandula, entitled "PROTECTION MECHANISMS FROM ATTACKS,";

U.S. Utility application Ser. No. 14/286,427, filed May 23, 2014, by Krishnakant M. Patel, Ravi Ayyasamy and Brahmananda R. Vempati, entitled "METHOD TO ACHIEVE A FULLY ACKNOWLEDGED MODE COMMUNICATION IN PUSH-TO-TALK OVER CELLULAR (PoC),", which application claims the benefit under 35 U.S.C. Section 119(e) of U.S. Provisional Application Ser. No. 61/826,895, filed May 23, 2013, by Krishnakant M. Patel, Ravi Ayyasamy and Brahmananda R. Vempati, entitled "METHOD TO ACHIEVE A FULLY ACKNOWLEDGED MODE COMMUNICATION IN PUSH-TO-TALK OVER CELLULAR (PoC),";

all of which applications are incorporated by reference herein.

BACKGROUND

1. Field of the Invention

This invention relates in general to advanced voice services in wireless communications networks, and more specifically, to a system and method for providing radio access network (RAN) aware service delivery for Push-to-talk-over-Cellular (PoC) networks.

2. Description of Related Art

Advanced voice services (AVS), also known as Advanced Group Services (AGS), such as two-way half-duplex voice calls within a group, also known as Push-to-talk-over-Cellular (PoC), Push-to-Talk (PTT), or Press-to-Talk (P2T), as well as other AVS functions, such as Push-to-Conference (P2C) or Instant Conferencing, Push-to-Message (P2M), etc., are described in the co-pending and commonly-assigned patent applications cross-referenced above and incorporated by reference herein. These AVS functions have enormous revenue earnings potential for wireless communications systems, such as cellular networks, wireless data networks and IP networks.

One approach to PoC is based on packet or voice-over-IP (VoIP) technologies. This approach capitalizes on the "bursty" nature of PoC conversations and makes network resources available only during talk bursts and hence is highly efficient from the point of view of network and spectral resources. This approach promises compliance with newer and emerging packet-based standards, such as GPRS (General Packet Radio Service), UMTS (Universal Mobile Telecommunications System), 3G, 4G, LTE, etc.

Nonetheless, there is a need in the art for improvements to the methods and systems for delivering the advanced voice services, such as PoC, that comply with both existing and emerging wireless packet-based standards and yet provide superior user experiences. Many existing implementations of PoC suffer from an inferior user experience. The present invention satisfies the need for a superior user experience, and also defines procedures for practical implementation of PoC in commercial, standards-based, cellular networks.

SUMMARY OF THE INVENTION

To overcome the limitations in the prior art described above, and to overcome other limitations that will become apparent upon reading and understanding the present specification, the present invention discloses a system and method for providing radio access network (RAN) aware service delivery for Push-to-talk-over-Cellular (PoC) networks.

The system and method includes one or more servers that interface to the wireless communications network to perform advanced voice services for one or more mobile units therein, wherein the advanced voice services include an instant two-way half-duplex voice call within a group of the mobile units comprising a PoC call session. Both the servers and the mobile units that use the advanced group services communicate with each other using control messages within the wireless communications network, and at least one of the servers switches voice messages for the advanced group services between the mobile units across the wireless communications network. At least one of the servers manages the PoC call session by acting as an arbitrator for the PoC call session and controls the sending of the control messages and the voice messages to and from the mobile unit. In addition, at least one of the servers performs an effective presence delivery method that reduces presence notifications delivered to the mobile units participating in the advanced voice services, by optimizing usage of service delivery mechanisms in the wireless communications network for delivery of presence notifications.

In one embodiment, the effective presence delivery method comprises throttling the delivery of the presence notifications, so that, when the presence notifications are dispatched to a watcher, subsequent presence notifications are sent to the watcher only after a delay, which may be static or dynamic. An outgoing presence notifications list is maintained for the watcher, and the delivery of the presence notifications on the outgoing presence notifications list is throttled. The presence notifications are updated, so that the presence notifications containing a latest presence status are delivered and the presence notifications containing an out-of-date presence status are not delivered.

In another embodiment, the effective presence delivery method comprises avoiding simultaneous dispatch of the presence notifications to multiple watchers located in the same cell or group of cells of the wireless communications network. The mobile units periodically report their location in the communications wireless network, and one or more of the servers track the location of the mobile units, wherein the location may be reported in a specific message generated by the mobile unit and sent to the server, or the location may be reported in a message having another purpose generated by the mobile unit and sent to the server. In addition, location change reports may be sent to the server when the mobile unit changes location. The server creates a list identifying the multiple watchers who are served by the same cell or group of cells in the wireless communications network based on their last reported location, and sends the presence notifications only to a first group having a specified number of the watchers who are served by the same cell or group of cells in the wireless communications network. Thereafter, the server may send the presence notifications only to a second group having a specified number of the watchers who are served by the same cell or group of cells in the wireless communications network after a delay for a specified time period.

In another embodiment, the effective presence delivery method comprises the server delaying sending the presence notifications for a mobile unit until the mobile unit triggers the server. The mobile unit may trigger the server when a user invokes the advanced voice services on the mobile unit, or the mobile unit may trigger the server when a user interacts with an application for the advanced voice services on the mobile unit. The presence notifications may contain a presence status for another mobile unit being watched by the mobile unit, or the presence notifications may contain a presence status for the mobile unit and are sent to a watcher of the mobile unit.

BRIEF DESCRIPTION OF THE DRAWINGS

Referring now to the drawings in which like reference numbers represent corresponding parts throughout.

DETAILED DESCRIPTION

Figure 1:
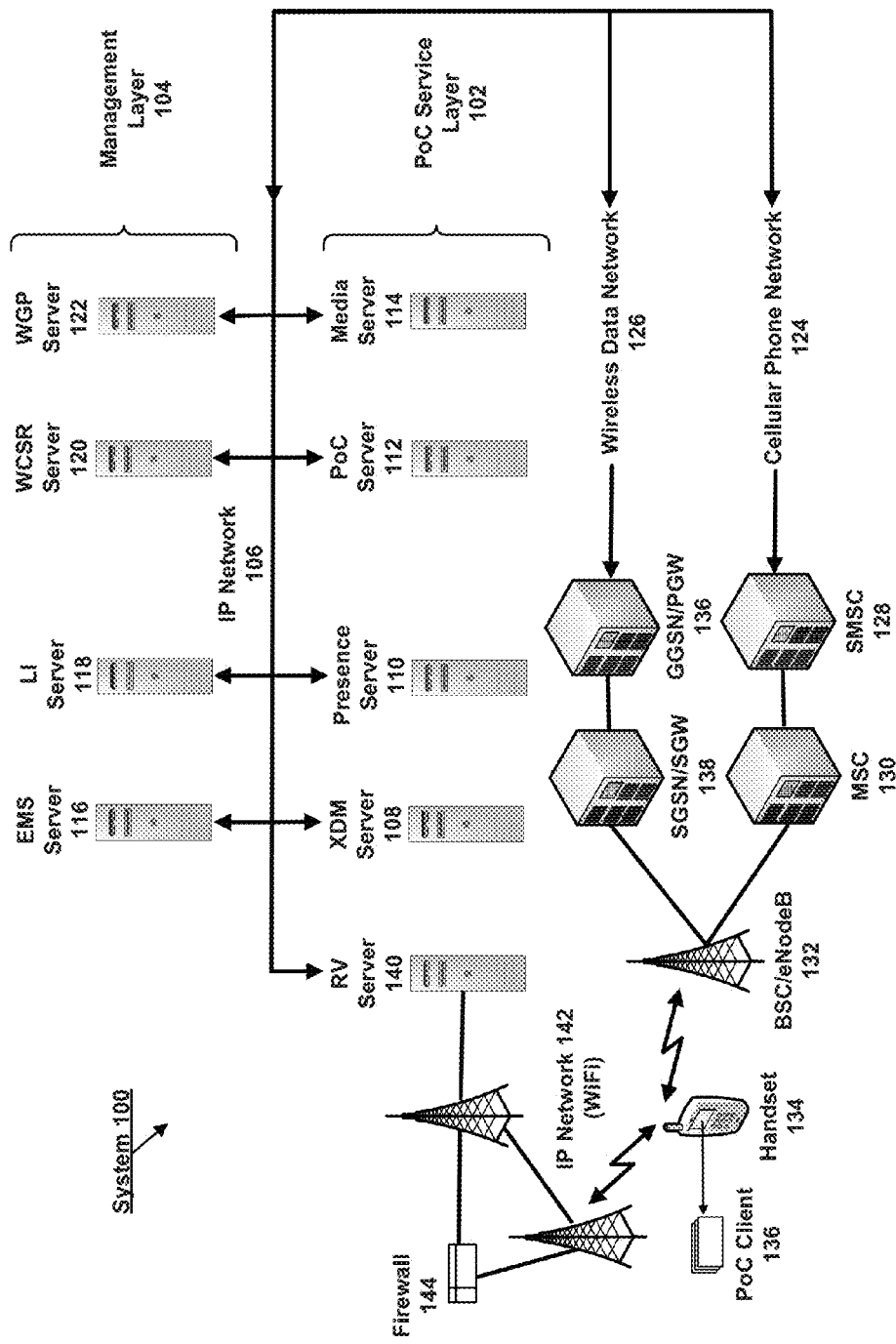
FIG. 1 illustrates the system architecture used in one embodiment of the present invention.

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

1 Overview

The present invention discloses a system for implementing advanced voice services in wireless communications networks that provides a feature-rich server architecture with a flexible client strategy. This system is an Open Mobile Alliance (OMA) standards-compliant solution that can be easily deployed, thereby enabling carriers to increase their profits, improve customer retention and attract new customers without costly upgrades to their network infrastructure. This system is built on a proven, reliable all-IP (Internet Protocol) platform. The highly scalable platform is designed to allow simple network planning and growth. Multiple servers can be distributed across operator networks for broad geographic coverage and scalability to serve a large and expanding subscriber base.

1.1 Definitions

The following table defines various acronyms, including industry-standard acronyms, that are used in this specification.

| Acronym | Description |
| --- | --- |
| ATCA | Advanced Telecommunications Computing Architecture |
| DnD | Do not Disturb |
| DNS | Domain Name Server |
| GPRS | General Packet Radio Service |
| GSM | Global System for Mobile communications |
| HTTP | Hypertext Transport Protocol |
| HTTPS | Secure Hypertext Transport Protocol |
| IMSI | International Mobile Subscriber Identity |
| IP | Internet Protocol |
| IPA | Instant Personal Alert |
| MBCP | Media Burst Control Protocol |
| MCC | Mobile Country Code |
| MDN | Mobile Directory Number |
| MNC | Mobile Network Code |
| MS-ISDN | Mobile Station International Subscriber Directory Number |
| OMA | Open Mobile Alliance |
| PoC | Push-to-talk-over-Cellular |
| PGW | Packet GateWay |
| PTT | Push-To-Talk |
| RTCP | Realtime Transport Control Protocol |
| RTP | Realtime Transport Protocol |
| SDP | Session Description Protocol |
| SIM | Subscriber Identity Module |
| SIP | Session Initiation Protocol |
| SMMP | Short Message peer-to-peer Protocol |
| SMS | Small Message Service |
| SSL | Secure Sockets Layer protocol |
| SSRC | Synchronization SouRCe |
| TLS | Transport layer security protocol |
| UDP | User Datagram Protocol |
| URI | Uniform Resource Identifier |
| VoIP | Voice-over-IP |
| SGW | Serving GateWay |
| XCAP | XML Configuration Access Protocol |
| XDM | XML Document Management |
| XML | Extensible Mark-up Language |
| 4G/LTE | $4^{th}$ Generation/Long Term Evolution |

The following table defines various terms, including industry-standard terms, that are used in this specification.

| Term | Description |
| --- | --- |
| 1-1 PoC Session | A feature enabling a PoC User to establish a PoC Session with another PoC User. |
| Ad Hoc PoC Group Session | A PoC Group Session established by a PoC User to PoC Users listed on the invitation. The list includes PoC Users or PoC Groups or both. |
| Answer Mode | A PoC Client mode of operation for the terminating PoC Session invitation handling. |
| Controlling PoC Function | A function implemented in a PoC Server, providing centralized PoC Session handling, which includes media distribution, Talk Burst Control, Media Burst Control, policy enforcement for participation in the PoC Group Sessions, and participant information. |
| Corporate | These subscribers will only receive contacts and groups from a corporate administrator. That means they cannot create their own contacts and groups from handset. |
| Corporate Public | These subscribers receive contacts and groups from a corporate administrator in addition to user-created contacts and groups. |
| Corporate Administrator | A user who manages corporate subscribers, their contacts and groups. |
| Firewall | A device that acts as a barrier to prevent unauthorized or unwanted communications between computer networks and external devices. |
| Home PoC Server | The PoC Server of the PoC Service Provider that provides PoC service to the PoC User. |
| Instant Personal Alert | A feature in which a PoC User sends a SIP based instant message to a PoC User requesting a 1-1 PoC Session. |
| Law Enforcement Agency | An organization authorized by a lawful authorization based on a national law to request interception measures and to receive the results of telecommunications interceptions. |
| Lawful Interception | The legal authorization, process, and associated technical capabilities and activities of Law Enforcement Agencies related to the timely interception of signaling and content of wire, oral, or electronic communications. |
| Notification | A message sent from the Presence Service to a subscribed watcher when there is a change in the Presence Information of some presentity of interest, as recorded in one or more Subscriptions. |
| Participating PoC Function | A function implemented in a PoC Server, which provides PoC Session handling, which includes policy enforcement for incoming PoC Sessions and relays Talk Burst Control and Media Burst Control messages between the PoC Client and the PoC Server performing the Controlling PoC Function. The Participating PoC Function may also relay RTP Media between the PoC Client and the PoC Server performing the Controlling PoC Function. |
| PoC Client | A functional entity that resides on the User Equipment that supports the PoC service. |
| Pre-Arranged PoC Group Identity | A SIP URI identifying a Pre-Arranged PoC Group. A Pre-Arranged PoC Group Identity is used by the PoC Client, e.g., to establish PoC Group Sessions to the Pre-Arranged PoC Groups. |
| Pre-Arranged PoC Group | A persistent PoC Group. The establishment of a PoC Session to a Pre-Arranged PoC Group results in the members being invited. |
| Pre-Established | The Pre-Established Session is a SIP Session established between the |

-continued

| Term | Description |
| --- | --- |
| Session | PoC Client and its Home PoC Server. The PoC Client establishes the Pre-Established Session prior to making requests for PoC Sessions to other PoC Users. To establish a PoC Session based on a SIP request from the PoC User, the PoC Server conferences other PoC Servers or users to the Pre-Established Session so as to create an end-to-end connection. |
| Presence Server | A logical entity that receives Presence Information from a multitude of Presence Sources pertaining to the Presentities it serves and makes this information available to Watchers according to the rules associated with those Presentities. |
| Presentity | A logical entity that has Presence Information associated with it. This Presence Information may be composed from a multitude of Presence Sources. A Presentity is most commonly a reference for a person, although it may represent a role such as "help desk" or a resource such as "conference room #27". The Presentity is identified by a SIP URI, and may additionally be identified by a tel URI or a pres URI. |
| Public | These subscribers create and manage their contacts and groups. |
| Serving Server | A set of primary and secondary servers. |
| Subscription | The information kept by the Presence Service about a subscribed watcher's request to be notified of changes in the Presence Information of one or more Presentities. |
| Watcher | Any uniquely identifiable entity that requests Presence Information about a Presentity from the Presence Service. |
| WiFi | A wireless local area network (WLAN). |

2. System Architecture

FIG. 1 illustrates the system architecture used in the present invention. This architecture conforms to the Advanced Telecommunications Computing Architecture (ATCA) standard to support the advanced voice services of the present invention. ATCA is an open standards-based, high-availability telecommunications platform architecture.

Preferably, the system 100 includes one or more PoC Service Layers 102 and one or more Management Layers 104, each of which is comprised of one or more servers interconnected by one or more IP networks 106. Specifically, the PoC Service Layer 102 includes one or more XML Document Management (XDM) Servers 108, Presence Servers 110, PoC Servers 112, and Media Servers 114, while the Management Layer 104 includes one or more Element Management System (EMS) Servers 116, Lawful Intercept (LI) Servers 118, Web Customer Service Representative (WCSR) Servers 120, and Web Group Provisioning (WGP) Servers 122. These various servers are described in more detail below.

The PoC Service Layer 102 and Management Layer 104 are connected to one or more wireless communications networks, such as cellular phone networks 124 and wireless data networks 126, as well as one or more IP networks 106. Note that the cellular phone networks 124 and wireless data networks 126 may be implemented in a single network or as separate networks. The cellular phone network 124 includes one or more Short Message Service Centers (SMSCs) 128, Mobile Switching Centers (MSCs) 130, and Base Station Components (BSCs) 132, wherein the BSCs 132 include controllers and transceivers that communicate with one or more customer handsets 134 (also referred to as a mobile unit, mobile station, mobile phone, cellular phone, etc.) executing a PoC Client 136. The wireless data network 126, depending on its type, e.g., GPRS or 4G/LTE, includes one or more Gateway GPRS Support Nodes (GGSNs) or Packet Gateways (PGWs) 136 and Serving GPRS Support Nodes (SGSNs) or Serving GateWays (SGWs) 138, which also communicate with customer handsets 134 via BSCs or eNodeBs 132.

Finally, in one embodiment of the present invention, the PoC Service Layer 102 and Management Layer 104 are connected to one or more RendeVous (RV) Servers 140, which are coupled to one or more external IP networks 142, such as WiFi networks 142, possibly using one or more Firewalls 144, in order to communicate with one or more PoC Clients 136 on one or more handsets 134. Traffic to and from the wireless data networks 126 also traverses the RV Servers 140.

2.1 Cellular Phone Network

The PoC Service Layer 102 interacts with the SMSC 128 on the cellular phone network 124 to handle Short Message Service (SMS) operations, such as routing, forwarding and storing incoming text messages on their way to desired endpoints.

2.2 Wireless Data Network

The PoC Service Layer 102 also interacts with the following entities on the wireless data network 126:

The GGSN/PGW 136 transfers IP packets between the PoC Client 136 and the various servers:
  SIP/IP signaling messages between the PoC Server 112 and PoC Client 136 for control traffic exchange (i.e., control packets) for PoC call sessions.
  RTP/IP, RTCP/IP and MBCP/IP packets between the Media Server 114 and PoC Client 136 for bearer traffic exchange (i.e., voice packets) for PoC call sessions.
  SIP/IP signaling messages between the Presence Server 110 and PoC Client 136 for presence information.
  XCAP/HTTP/IP and SIP/IP signaling between the XDM Server 108 and PoC Client 136 for document management.

The SMSC 128 handles authentication:
  The XDM Server 108 communicates with the SMSC 128 via SMPP/IP for receiving the authentication code required for PoC Client 136 activation from the handset 134.

2.3 WiFi Network

The PoC Service Layer 102 also interacts with the following entities on the WiFi network 142:

The RV Server 140 transfers IP packets between the PoC Client 136 and the various servers:
- SIP/IP signaling messages between the PoC Server 112 and PoC Client 136 for control traffic exchange (i.e., control packets) for PoC call sessions.
- RTP/IP, RTCP/IP and MBCP/IP packets between the Media Server 114 and PoC Client 136 for bearer traffic exchange (i.e., voice packets) for PoC call sessions.
- SIP/IP signaling messages between the Presence Server 110 and PoC Client 136 for presence information.
- XCAP/HTTP/IP and SIP/IP signaling between the XDM Server 108 and PoC Client 136 for document management.
- SIP/IP signaling messages between the XDM Server 108 and PoC Client 136 for receiving the authentication code required for PoC Client 136 activation from the handset 134.

2.4 PoC Service Layer Elements

As noted above, the PoC Service Layer 102 is comprised of the following elements:
- PoC Server 112,
- Media Server 114,
- Presence Server 110,
- XDM Server 108, and
- RV Server 140.

These elements are described in more detail below.

2.4.1 PoC Server

The PoC Server 112 handles the PoC call session management and is the core for managing the PoC services for the PoC Clients 136 using SIP protocol. The PoC Server 112 implements a Control Plane portion of Controlling and Participating PoC Functions. A Controlling PoC Function acts as an arbitrator for a PoC Session and controls the sending of control and bearer traffic by the PoC Clients 136. A Participating PoC Function relays control and bearer traffic between the PoC Client 136 and the PoC Server 112 performing the Controlling PoC Function.

2.4.2 Media Server

The Media Server 114 implements a User Plane portion of the Controlling and Participating PoC Functions. The Media Server 114 supports the Controlling PoC Function by duplicating voice packets received from an originator PoC Client 136 to all recipients of the PoC Session. The Media Server 114 also supports the Participating PoC Function by relaying the voice packets between PoC Clients 136 and the Media Server 114 supporting the Controlling PoC Function. The Media Server 114 also handles packets sent to and received from the PoC Clients 136 for floor control during PoC call sessions.

2.4.3 Presence Server

The Presence Server 110 implements a presence enabler for the PoC Service. The Presence Server 110 accepts, stores and distributes Presence Information for Presentities, such as PoC Clients 136.

The Presence Server 110 also implements a Resource List Server (RLS), which accepts and manages subscriptions to Presence Lists. Presence Lists enable a "watcher" application to subscribe to the Presence Information of multiple Presentities using a single subscription transaction.

The Presence Server 110 uses certain XDM functions to provide these functions, which are provided by XDM Server 108.

2.4.4 XDM Server

The XDM Server 108 implements an XDM enabler for the PoC Service. The XDM enabler defines a common mechanism that makes user-specific service-related information accessible to the functions that need them. Such information is stored in the XDM Server 108 where it can be located, accessed and manipulated (e.g., created, changed, deleted, etc.). The XDM Server 108 uses well-structured XML documents and HTTP protocol for access and manipulation of such XML documents. The XDM Server 108 also connects to the operator SMSC 128 for the purposes of PoC Client 136 activation using SMS. In addition, the XDM Server 108 maintains the configuration information for all PoC subscribers.

2.4.5 RV Server

The RV Server 140 implements a interworking solution for the PoC Service to communicate via one or more IP network 142 access points to the PoC Clients 136. Specifically, the RV Server 140 provides PoC Service over an IP network 142 (such as an external WiFi network), as well as the wireless data networks 126, and supports a seamless user experience while the transport of IP control messages and IP voice data is transitioned between different types of wireless communications networks, such as wireless data networks 126 comprising cellular data packet networks and IP networks 142. The RV Server 140 also resolves security concerns that arise with such interworking solutions.

This is necessary because the quality, performance and availability of the wireless data networks 126 typically vary from location to location based on various factors. In addressing these issues, the interworking solution implemented by the RV Server 140 provides following benefits:
- PoC Services becomes available even in those locations where a wireless data network 126 is not available, but where a general purpose IP network 142 is available. This is particularly more useful in enhancing in-building coverage for the PoC Service.
- By connecting over the IP network 142, the available IP bandwidth, quality and performance can be more streamlined and controlled since the IP network 142 (typically) has a greater capacity and throughput as compared to the wireless data network 126, which is more shared in nature.
- By utilizing the greater available bandwidth over the IP network 142, as compared to the wireless data network 126, it is possible to provide additional services (such as sharing large files) which otherwise is inefficient and costly on wireless data networks 126.

These and other aspects of the interworking solution are described in more detail below.

2.5 Management Layer Elements

As noted above, the Management Layer 104 is comprised of the following elements:
- Element Management System (EMS) Server 116,
- Lawful Intercept (LI) Server 118,
- Web Group Provisioning (WGP) Server 122, and
- Web Customer Service Representative (WCSR) Server 120.

These elements are described in more detail below.

2.5.1 EMS Server

The EMS Server 116 is an operations, administration, and maintenance platform for the system 100. The EMS Server 116 enables system administrators to perform system-related configuration, network monitoring and network performance data collection functions. The EMS Server 116, or another dedicated server, may also provide billing functions. All functions of the EMS Server 116 are accessible through a web-based interface.

2.5.2 LI Server

The LI Server 118 is used for tracking services required by various Lawful Enforcement Agents (LEAs). The LI Server 118 generates and pushes an IRI (Intercept Related Information) Report for all PoC Services used by a target. The target can be added or deleted in to the PoC Server 112 via the LI Server 118 using a Command Line Interface (CLI).

2.5.3 WGP Server

The WGP Server 122 provides a web interface for corporate administrators to manage PoC contacts and groups. The web interface includes contact and group management operations, such as create, delete and update contacts and groups.

2.5.4 WCSR Server

The WCSR Server 120 provides access to customer service representatives (CSRs) for managing end user provisioning and account maintenance.

Typically, it supports the following operations:
Create Subscriber account,
Update Subscriber account,
Delete Subscriber account,
Mobile number change command,
View Subscriber details (MDN, Group, Group members),
Manage Corporate Accounts,
Add CSR account,
Delete CSR account.

3 System Functions

The following sections describe various functions performed by each of the components of the system architecture.

3.1 PoC Service Layer

3.1.1 PoC Server

The PoC Server 112 controls PoC call sessions, including 1-1, Ad Hoc and Pre-Arranged PoC call sessions. The PoC Server 112 also controls Instant Personal Alerts.

The PoC Server 112 expects the PoC Clients 136 to setup "pre-established sessions" at the time of start up and use these sessions to make outgoing PoC calls. The PoC Server 112 also uses pre-established sessions to terminate incoming PoC calls to the PoC Clients 136. The PoC Clients 136 are setup in auto-answer mode by default. The use of pre-established sessions and auto-answer mode together allow for faster call setup for PoC call sessions.

The PoC Server 112 allocates and manages the media ports of the Media Services 114 associated with each SIP INVITE dialog for pre-established sessions and controls the Media Servers 114 to dynamically associate these ports at run time for sending RTP packets during PoC call sessions. Media ports are assigned and tracked by the PoC Server 112 at the time of setting up pre-established sessions. The PoC Server 112 instructs the Media Server 114 to associate the media ports of various subscribers dynamically into a session when a PoC call is originated and this session is maintained for the duration of the call. The PoC Server 112 also controls the floor states of the various participants in a PoC call session by receiving indications from the Media Servers 114 and sending appropriate requests back to the Media Servers 114 to send MBCP messages to the participants in the PoC call. The Media Server 114 uses the media ports association and current talker information to send the RTP packets from the talker's media port onto the listeners' media ports.

In addition, the PoC Server 112 handles the incoming and outgoing Instant Personal Alerts (IPAs) by routing SIP MESSAGE requests to the PoC Clients 136 and remote PoC Servers 112 for final delivery as applicable.

The PoC Server 112 uses static and dynamic data related to each subscriber to perform these functions. Static data include subscriber profile, contacts and groups. Dynamic data include the subscriber's registration state, PoC settings and SIP dialog states are maintained only on the PoC Server 112.

3.1.2 Media Server

The Media Server 114 handles the flow of data to and from the PoC Clients 136 as instructed by the PoC Server 112. Each Media Server 114 is controlled by a single PoC Server 112, although multiple Media Servers 114 may be controlled by a PoC Server 112 simultaneously.

The Media Server 114 is completely controlled by the PoC Server 112. As noted above, even the media ports of the Media Server 114 are allocated by the PoC Server 112 and then communicated to the Media Server 114. Likewise, floor control requests received by the Media Server 114 from PoC Clients 136 are sent to the PoC Server 112, and the PoC Server 112 instructs the Media Server 114 appropriately. Based on these instructions, the Media Server 114 sends floor control messages to the PoC Clients 136 and sends the RTP packets received from the talker to all the listeners.

3.1.4 Presence Server

The Presence Server 110 accepts presence information published by PoC Clients 136, as well as availability information received from other entities. The Presence Server 110 keeps track of these presence states and sends notifications to various "watcher" applications whenever a presence state changes. The Presence Server 110 maintains separate subscriptions for each watcher and dynamically applies the presence authorization rules for each watcher independently.

The Presence Server 110 also accepts resource list subscriptions from the watchers, which identify one or more entities ("Presentities") whose presence should be monitored. The Presence Server 110 then aggregates all the presence information into one or more presence notifications transmitted to each watcher. This allows watchers to subscribe to large number of Presentities without putting strain on the network as well as client and server resources.

3.1.5 XDM Server

The XDM Server 108 performs client authentication and subscription functions. The XDM Server 108 also stores subscriber and group information data. The XDM Server 108 also interacts with the SMSC 128 to receive PoC Client 136 activation commands.

All subscriber provisioning and CSR operations in the XDM Server 108 are performed through the WCSR Server 120, while corporate administrative operations, as well as contacts and group management, are handled through the WGP Server 122.

The XDM Server 108 includes a Subscriber Profile Manager module that provides subscriber management functionality, such as creation, deletion and modification of subscriber profiles. The subscriber profile includes data such as the MDN, subscriber name, subscriber type, etc. This also determines other system-wide configurations applicable for the subscriber including the maximum number of contacts and groups per subscriber and the maximum number of members per group.

The XDM Server 108 includes a Subscriber Data Manager module that manages the subscriber document operations, such as contact and group management operations, initiated by the PoC Clients 136 or the WGP Server 122.

3.1.6 RV Server

The RV Server 140 performs interworking for the PoC service by communicating with the PoC Clients 136 via one or more IP networks 142 and/or wireless data networks 126.

The PoC Client 136 sets up one or more connections using the configured Fully Qualified Domain Name (FQDN), or absolute domain name, of the RV Server 140, which may be publicly exposed to the Internet. Secure transport protocols may (or may not) be used for the connections across the IP networks 142 and/or wireless data networks 126. For example, the PoC Clients 136 may use the Transport Layer Security (TLS) and/or Secure Sockets Layer (SSL) protocols for encrypting information transmitted over the connections between the PoC Client 136 and the RV Server 140.

In such an embodiment, all SIP signaling and voice data (RTP and RTCP) would be tunneled over the SSL/TLS connections between the PoC Client 136 and the RV Server 140. XCAP signaling may be transmitted using a Hypertext Transfer Protocol Secure (HTTPS) protocol, which results from layering the Hypertext Transfer Protocol (HTTP) on top of the SSL/TLS connections, thus adding the security capabilities of SSL/TLS to standard HTTP communications.

Consequently, the RV Server 140 performs as an encryption/decryption off-loader that provides end-to-end encryption for all traffic transmitted to and from the PoC Client 136. Specifically, all of the traffic sent to the PoC Client 136 is encrypted at the RV Server 140 and all the traffic received from the PoC Client 136 is decrypted at the RV Server 140.

The RV Server 140 terminates the SSL/TLS connections and aggregates or dis-aggregates the PoC Client 136 traffic to the appropriate Servers 108, 110, 112, 114, 116, 118, 120 and 122. Specifically, the RV Server 140 acts as an intelligent traffic distributor for SIP signaling and RTP/RTCP traffic by forwarding the traffic to the appropriate Servers 108, 110, 112, 114, 116, 118, 120 and 122, depending on the message types and the availability of the Servers 108, 110, 112, 114, 116, 118, 120 and 122. Consequently, the RV Server 140 is a single point-of-contact for all traffic to and from the PoC Clients 136 at an IP transport layer via the IP networks 142 and/or wireless data networks 126.

Typically, the SSL/TLS connections are persisted and used for any bidirectional data transfer between the RV Server 140, or other Servers, and the PoC Clients 136. Thus, a PoC Client 136 maintains an "always-on" connection with the RV Server 140 by periodically sending "keep-alive" messages over the SSL/TLS connections.

The system also simplifies the traversal of the Firewalls 144. Preferably, the PoC Clients 136 establish the SSL/TLS connections to the RV Server 140 over TCP port 443, which is typically used for HTTPS communications. This allows for Firewall 144 traversal on most corporate networks, because the Firewall 144 facing (exposed to) the Internet is default configured to allow (and not deny) the SSL/TLS connections on TCP port 443. As a result, the system does not require that any special changes be made to the Firewall 144, such as those changes typically required for VoIP deployments in corporate networks. Instead, the traffic with the PoC Clients 136 is routed over SSL/TLS connections on TCP port 443, which can traverse through the Firewalls 144 seamlessly.

3.2 Management Layer 3.2.1 EMS Server

The EMS Server 116 is the central management entity in the system and includes the following modules:

A central application where all management business logic resides.

A web server for serving the network operator's internal users. A corresponding client provides a user interface for viewing fault, configuration, performance and security information.

A subsystem is provided for health monitoring of network elements deployed in the system and also to issue any maintenance commands as applicable.

3.2.2 WCSR Server

The WCSR Server 120 provides a web user interface for customer service representatives (CSRs) to carry out various operations. The web user interface provides access to CSRs for managing subscriber provisioning and account maintenance. Typically, it supports the following operations.

Create Subscriber account,
Update Subscriber account,
Delete Subscriber account,
Mobile number change command,
Forced synchronization of a Subscriber,
Deactivate a Subscriber account,
Reactivate a Subscriber account,
View Subscriber details, such as MDN, Group, Group members.

3.2.3 WGP Server

The WGP Server 122 allows provides for central management of all corporate subscribers and associated contacts and groups within a corporation. The WGP Server 122 allows corporate administrators to manage contacts and groups for corporate subscribers.

The WGP Server 122 includes a Corporate Administration Tool (CAT) that is used by corporate administrators to manage contacts and groups of corporate subscribers. The CAT has a Web User Interface for corporate administrators that supports the following operations:

group management,
contact management, and
associations between corporations.

With regard to group management, the CAT of the WGP Server 122 includes the following operations:

Create, Update, Delete and View Corporate Groups,
Add, Update, Delete and View Members of a Corporate Group,
Manage Subscribers,
Activate and Deactivate a Corporate Subscriber,
Change a Subscriber type from "Corporate" to "Corporate And Public", and vice versa,
Restrict Availability, i.e., do not allow subscriber to change their presence status, and
Manage number porting or name change via phone assignment.

With regard to contact management, the CAT of the WGP Server 122 includes the following operations:

Phone list management,
N×N Contact Add (e.g., N contacts may be members of N groups),
Add, Update, Delete and View Contacts for a specific subscriber, and
Export and Import contacts at both the subscriber and corporate level.

With regard to associations between corporations, the CAT of the WGP Server 122 includes the following operations:

Corporate Associations Attributes,
Association Name,
Association ID,
Association Mode (e.g., One-way, Two-way), and
Restricted List.

Once the association is created and accepted, corporate administrators can create contacts and groups using the association policies. Administrators from other corporations can view the contacts, and may or may not have the capability to add, update or delete the contacts.

Corporate ID associated per corporate subscriber,
Central management of corporate subscribers, groups, and contacts, Intercorporate associations, including contacts and whitelists,
Phone list management (e.g., N×N contact add),
Restrict Availability, and
Import and Export contacts at both the subscriber and corporate level.

Note that, if the association is deleted, then usually all intercorporate contacts and group members will be deleted.

3.3 PoC Client

The PoC Client 136 is an OMA-compatible client application executed on a handset 134. The following features are supported by the PoC Client 136:

PoC Calls and Instant Personal Alert,
Presence, and
Contact and Group Management.

The PoC Client 136 includes a database module, a presence module, an XDM module and a client module.

The database module stores configuration information, presence information, contact and group information, user settings, and other information in an optimized and persistent way. Information is preserved when the user unregisters with the PoC Server 112 or power cycles the device. The database module also has a mechanism to reset the data and synchronize from the XDM Server 108 when the data in the database module is corrupt or unreadable.

The presence module creates and maintains the presence information for the subscriber. Typically, the presence information supports Available, Unavailable and Do-not-Disturb (DnD) states. The presence module also subscribes to the Presence Server 110 as a "watcher" of all contacts in the handset 134 and updates the user interface of the handset 134 whenever it receives a notification with such presence information.

The XDM module communicates with the XDM Server 108 for management of contacts and groups. The XDM module may subscribe with the XDM Server 108 to send and receive any changes to the contacts or group list, and updates the user interface of the handset 134 based on the notifications it receives from the XDM Server 108.

The client module provides the most important function of making and receiving PoC calls. To support PoC calls, the client module creates and maintains pre-established sessions with the PoC Server 112. The client module supports 1-1, Ad Hoc and Pre-Arranged PoC calls. The client module also supports sending and receiving Instant Personal Alerts (IPA).

4 State Diagram for a PoC Call Session

Figure 2:
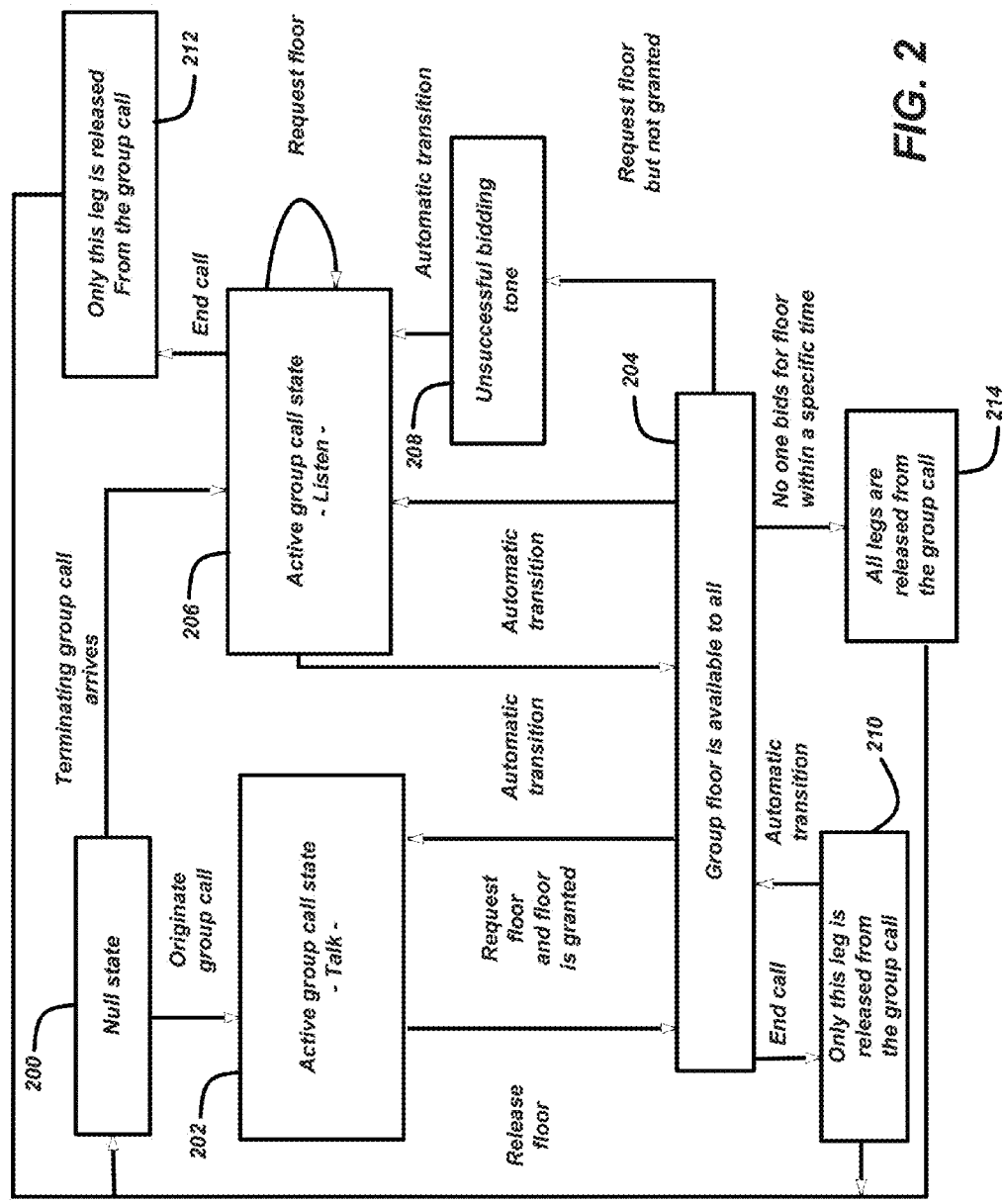
FIG. 2 is a state diagram that illustrates the operation of a PoC session according to one embodiment of the present invention.

FIG. 2 is a state diagram that illustrates the operation of a PoC call session according to one embodiment of the present invention.

State 200 represents a PoC Client 136 in a NULL state, i.e., the start of the logic. A transition out of this state is triggered by a user making a request to originate a PoC call, or by a request being made to terminate a PoC call at the handset 134. A request to originate a PoC call is normally made by pressing a PoC button, but may be initiated in this embodiment by dialing some sequence of one or more numbers on the handset 134 that are interpreted by the PoC Server 112, by pressing one or more other keys on the handset 134 that are interpreted by the PoC Server 112, by speaking one or more commands that are interpreted by the PoC Server 112, or by some other means.

State 202 represents the PoC Client 136 in an active group call state, having received a "floor grant" (permit to speak). In this state, the user receives a chirp tone that indicates that the user may start talking. The user responds by talking on the handset 134. The handset 134 uses the reverse traffic channel to send voice frames to the Media Server 114, and the Media Server 114 switches voice frames only in one direction, i.e., from talker to one or more listeners, which ensures the half-duplex operation required for a PoC call.

State 204 represents the group "floor" being available to all members of the group. When the talking user signals that the floor is released, the floor is available to all group members. The signal to release the floor is normally made by releasing the PoC button, but may be performed in this embodiment by voice activity detection, e.g., by not speaking for some time period (which is interpreted by the PoC Server 112 as a release command). All members of the group receive a "free floor" tone on their handset 134. A user who requests the floor first (in the "free-floor" state), for example, is granted the floor, wherein the system 100 sends a chirp tone to the successful user. The signal to request the floor is normally made by pressing the PoC button, but may be performed in this embodiment by voice activity detection, e.g., by speaking for some time period (which is interpreted by the PoC Server 112 as a request command).

State 206 represents the PoC Client 136 being in an active group call state. In this state, the user is listening to the group call. If a non-talking user requests the floor in the active group call state, the user does not receive any response from the system 100 and remains in the same functional state. As noted above, the signal to request the floor is normally made by pressing the PoC button, but may be performed in this embodiment by voice activity detection, e.g., by speaking for some time period (which is interpreted by the PoC Server 112 as a request command).

State 208 represents a user receiving an "unsuccessful bidding" tone on his handset 134, after the user has requested the floor, but was not granted the floor, of the group call. The user subsequently listens to the voice message of the talking user.

Non-talking users (including the talking user who must release the floor to make it available for others) can request the system 100 to end their respective call legs explicitly.

State 210 represents a terminating leg being released from the call after the user ends the call.

State 212 also represents a terminating leg being released from the call after the user ends the call.

State 214 represents all terminating legs being released from the call when no user makes a request for the within a specified time period, or after all users have ended their respective call legs.

5 Effective Presence for Push-to-Talk-over-Cellular (PoC) Networks

5.1 Introduction

Presence related messages for PoC calls place a significant burden on the system 100 due to increased message traffic, in addition to increased demands on server 110 resources, and increased battery usage on mobile handsets 134, as the number of contacts per subscriber and watcher list grows.

Presence related messages generally comprise the following:

Change in network presence of a PoC Client 136 due to login (Online) or logout (Offline) and Temporary Unavailability (TU) detection by the Presence Server 110; and Change in self-availability status by a PoC Client (Available, DnD, etc.).

Every time there is a change in the presence status of a PoC Client 136, an update message is typically sent to all members in the contact/group list of the concerned PoC Client 136.

Such update messages create significant message traffic in the system 100, especially in the following cases:

- a PoC Client 136 with a large number of contacts (e.g., 1000 contacts), or
- simultaneous or near-simultaneous change of presence of a large number of PoC Clients 136 (e.g., morning or evening time when users login or logout of the system 100).

Presence related signaling traffic at extreme levels results in increased network load, demands significant server/hardware resources, and also leads to increased battery usage on mobile handsets 134. An effective approach to optimization of presence traffic is required to reduce network load, server resources and conserve handset 134 battery life 5.1 RAN-Aware Service Delivery Mechanisms Focus In the present invention, at least one of the servers, namely the Presence Server 110, performs one or more effective presence delivery methods that reduce presence notifications delivered to the PoC Clients 136 on the handsets 134 participating in the advanced voice services, by optimizing usage of service delivery mechanisms in the wireless communications networks 124, 126, 142 for delivery of presence notifications.

Specifically, these methods are directed to optimized usage of the service delivery mechanisms for each Radio Access Network (RAN), such as the cellular phone network 124, the wireless data network 126 (which may comprise a 3G/4G/LTE network), and the WiFi IP network 142, for delivery of presence notifications and PoC call sessions. The methods focus on the following factors:

(1) Throttled delivery, so that RAN congestion is avoided;
(2) RAN activity monitoring and presence delivery through the use of location information reported during registration and call sessions; and
(3) lazy presence updates.

These and other aspects of the methods of the present invention are described in more detail below.

5.3 Presentity, Presence Status and Watcher

Effective presence is provided for one or more Presentities. A Presentity is a user publishing his/her presence status to all of his contacts/watchers via the Presence Server 110 and PoC Client 136.

The presence status refers to the current status of a Presentity. A status change can be triggered by the user (e.g., by indicating that the user is available, or away, or DnD, etc.), and a status change can be automatically detected by the system 100 (e.g., detecting whether the PoC Client 136 is online, offline, temporarily unavailable, etc.).

A watcher is one interested in the presence status information of his/her contacts. Generally, the latest presence status information is received via presence notification messages or updates.

5.4 Impact of Presence Traffic in PoC 5.4.1 Impact of Excessive Presence Traffic Excessive presence traffic results in inefficient usage of network resources, including signaling costs, increased server 110 resource usage, and increased battery usage in handsets 134.

With regard to signaling costs, cellular phone networks 124, wireless data networks 126, and WiFi IP networks 142 are designed to optimize usage of the wireless spectrum and typically allocate wireless spectrum for communications only on an as-needed basis. The whole mechanism involves very complex logic for signaling and resource assignment. These networks 124, 126, 142 are typically optimized for a continuous stream of data periodically (at fixed time intervals) or for short duration of time (burst traffic). Intermittent data delivery to the handsets 134 causes very inefficient usage of network 124, 126, 142 resources.

With regard to increased server resource usage, Presence Server 110 resources such as processing cycles, memory, storage, etc., are utilized to process presence status updates and to subsequently generate a large number of notifications.

With regard to increased battery usage, mobile devices 134 are optimized to use the radio transmitter/receiver only when data transmission is required. Receiving a high frequency of presence updates causes inefficient usage of battery usage in the devices 134.

5.4.2 Source of High Presence Traffic

In some Push-to-Talk (PTT) systems, such as the NEXTEL system, there is no presence notification. This eliminates the large amount of network traffic related to presence notifications. However, users are do not know, before placing a PTT call, if a contact is available or not. In other systems, such as the PoC system (R7.x) provided by Kodiak Networks, Inc., the assignee of the present invention, a presence notification is sent to the PoC Client 136 whenever there is a change in presence status of any member of the contact list in the PoC Client 136. Typically, due to the linkage of the presence function with the contact list of the PoC Client 136, the average number of watchers receiving presence notifications pertaining to that PoC Client 136 is proportionate to the average contact list size among all PoC Clients 136 in the system 100. Note that, in this case, or even in case of a PoC Client 136 with 1000 contacts, where the user has invoked any PoC service with, e.g., only 10 contacts, the PoC Client 136 will receive presence status update messages pertaining to all 1000 contacts.

In enterprises with large numbers of groups and contacts, where users login and logout around same time on a day, the volume of presence messages can overwhelm the system 100. Further, considering that a typical PoC user communicates with a small number of other PoC users via PoC calls, sending presence notifications to all groups and contacts at all times is wasteful from the perspective of network traffic, as well as Presence Server 110 capacity.

5.5 Proposed Solutions for Effective Presence 5.5.1 Throttling Presence Notifications to a Watcher In one embodiment, the effective presence delivery method comprises throttling the delivery of the presence notifications, so that, when the presence notifications are dispatched to a watcher, subsequent presence notifications are sent to the watcher only after a delay, which may be static or dynamic. An outgoing presence notifications list is maintained for the watcher, and the delivery of the presence notifications on the outgoing presence notifications list is throttled. The presence notifications are updated, so that the presence notifications containing a latest presence status are delivered and the presence notifications containing an out-of-date presence status are not delivered.

Figure 3:
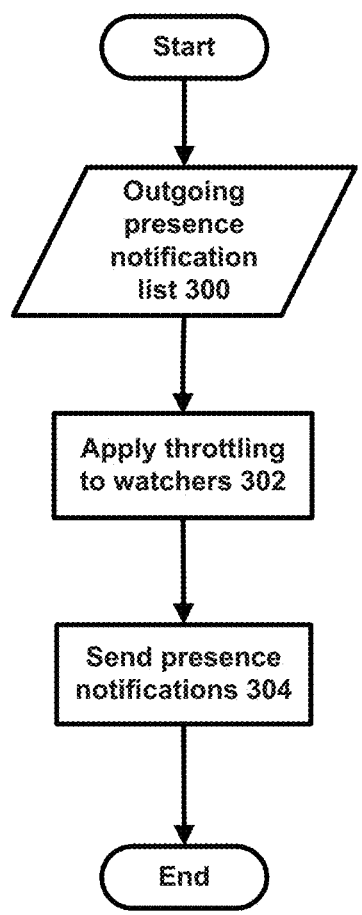
FIG. 3 is a flowchart that illustrates an optimization method that throttles presence notifications to a watcher.

FIG. 3 is a flowchart that further illustrates this optimization method that throttles presence notifications to a watcher.

Block 300 represents the Presence Server 110 maintaining an outgoing presence notifications list for each PoC Client 136 that is a watcher.

Block 302 represents the Presence Server 110 throttling the outgoing presence notifications list to the watcher, so that, when one or more presence notifications are dispatched to the watcher, subsequent presence notifications are sent to the same watcher only after a delay of some time period T1 (e.g., seconds, minutes, etc.).

The value for T1 could be static (e.g. every 5 minutes) or dynamic (e.g., a calculated value, such as an exponential value or a value calculated based on overall load conditions of the Presence Server 110). For example, during busy hours of the day, a delay may be applied; whereas, during off hours of the day, no delay may be applied.

Further, if there are any changes in the presence status of a particular PoC Client 136 whose presence notifications are waiting to be delivered in the outgoing presence notifications list, Block 304 represents the Presence Server 110 updating the outgoing presence notifications list, so that only the presence notifications containing the latest presence status are delivered and the presence notifications containing an out-of-date presence status may not be delivered.

5.5.2 RAN Optimization

In another embodiment, the effective presence delivery method comprises avoiding simultaneous dispatch of the presence notifications to multiple watchers located in the same cell or group of cells of the wireless communications network 124, 126, 142. The handsets 134 periodically report their location in the wireless communications network 124, 126, 142, and the Presence Server 110 tracks the location of the handsets 134, wherein the location may be reported in a specific message generated by the handsets 134 and sent to the Presence Server 110, or the location may be reported in a message having another purpose generated by the handsets 134 and sent to the Presence Server 110. In addition, location change reports may be sent to the Presence Server 110 when the handset 134 changes location. The Presence Server 110 creates a list identifying the multiple watchers who are served by the same cell or group of cells in the wireless communications network 124, 126, 142 based on their last reported location, and sends the presence notifications only to a first group having a specified number of the watchers who are served by the same cell or group of cells in the wireless communications network 124, 126, 142. Thereafter, the Presence Server 110 may send the presence notifications only to a second group having a specified number of the watchers who are served by the same cell or group of cells in the wireless communications network 124, 126, 142 after a delay for a specified time period.

In one scenario, consider a large group of PoC Clients 136, each having large contact lists. When the presence status of one of the PoC Clients 136 changes, this is reported to the Presence Server 110 and the Presence Server 110 may, in turn, send a large number of presence notifications to all of the watchers for that PoC Client 136, namely the contact list for that PoC Client 136. One or more of the networks 124, 126, 142 are used as a transport to exchange and distribute the presence notifications between the PoC Clients 136 and the Presence Server 110.

Challenges arise, however, because the capacity of the networks 124, 126, 142 is limited. Frequent exchanges of presence notifications between PoC Clients 136 may result in congestion in the networks 124, 126, 142, when combined with utilization of the networks 124, 126, 142 for other services. Thus, the Presence Service 110 needs to consider the resources utilized by RANs when presence notifications are exchanged between the Presence Server 110 and the PoC Clients 136.

In one embodiment, the present invention provides a solution for optimizing the use of RANs for presence notifications. This optimization arises when a plurality of PoC Clients 136 are concentrated in one or more cells of a network 124, 126, 142. Specifically, the optimization avoids the simultaneous dispatch of presence notifications to multiple PoC Clients 136 that are watchers when located in same cell or group of cells, so as to avoid network 124, 126, 142 congestion. Although having the latest presence notifications may be important, the injection of some delay in the delivery of presence notifications is not expected to cause much degradation in users' experience.

Figure 4:
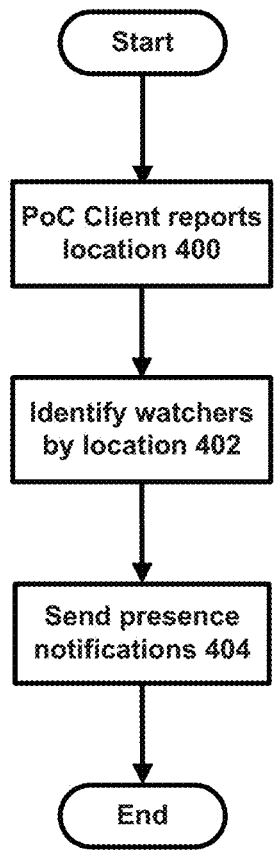
FIG. 4 is a flowchart that illustrates an optimization method that avoids simultaneous dispatch of the presence notifications to multiple watchers located in the same cell or group of cells of the wireless communications network.

FIG. 4 is a flowchart that further illustrates this optimization method that avoids simultaneous dispatch of the presence notifications to multiple watchers located in the same cell or group of cells of the wireless communications network 124, 126, 142.

Block 400 represents one or more PoC Clients 136 periodically reporting their location in the network 124, 126, 142 at the cell level, e.g., by providing the mobile country code (MCC), the mobile network code (MNC), the location area code (LAC), and the cell identifier, or other similar information, to the Presence Server 110, so that the Presence Server 110 can track the location of each PoC Client 136.

Note that this information can be sent in a specific message generated just for this purpose, or it can be included with other messages, such as in a LOGIN message, or the periodic exchange of SIP REGISTER messages, etc., which avoids generating a specific message just for this purpose. The timing interval can be static or dynamic, as desired.

However, location change reports may or may not be sent to the Presence Server 110 when the PoC Clients 136 move from one cell to another cell in the network 124, 126, 142 or between networks 124, 126, 142. For example, such location change reports may not be sent to the Presence Server 110 to reduce the number of messages being exchanged. Even though the location data in the Presence Server 110 may not be as accurate, the last reported location may be close enough.

When a user-initiated or network-initiated event causes the presence status to change for a PoC Client 136, the Presence Server 110 may or may not immediately dispatch presence notifications to other PoC Clients 136 that are watchers. For example, the Presence Server 110 may apply the following logic.

Block 402 represents the Presence Server 110 identifying the watchers who are served by same cell or group of cells in the network 124, 126, 142. Specifically, the Presence Server 110 creates a list identifying the watchers who are served by same cell or group of cells based on the last reported location information reported by the PoC Client 136.

Note that the location of some of the PoC Clients 136 may not be accurate, as they could have moved away from the last reported cell. However, that does not alter the benefits of the optimization method suggested herein.

Block 404 represents the Presence Server 110 sending presence notifications to not more than "X" distinct watchers who are served by the same cell or group of cells in a network 124, 126, 142. If there are more than "X" distinct watchers in the same cell or group of cells, then the presence notifications are throttled at the Presence Server 110, so that the total number of presence notifications delivered in any cell or group of cells is not more than "X" for a specified time period T1. The Presence Server 110 can dispatch each such set of presence notifications for every specified time period T1.

5.5.3 Lazy Presence Updates

Another approach to reducing presence notification traffic is to delay presence updates ("Lazy Presence"). In this embodiment, the Presence Server 110 delays sending the presence notifications for a handset 134 until the handset 134 triggers the Presence Server 110. The handset 134 may trigger the Presence Server 110 when a user invokes the advanced voice services on the handset 134, or the handset 134 unit may trigger the Presence Server 110 when a user interacts with an application for the advanced voice services on the handset 134. The presence notifications may contain a presence status for another handset 134 being watched by the triggering handset 134, or the presence notifications may contain a presence status for the triggering handset 134 itself, which are sent to a watcher of the triggering handset 134. This not only delays the presence notification traffic, it also optimizes the notification of multiple status changes for a handset 134.

Figure 5:
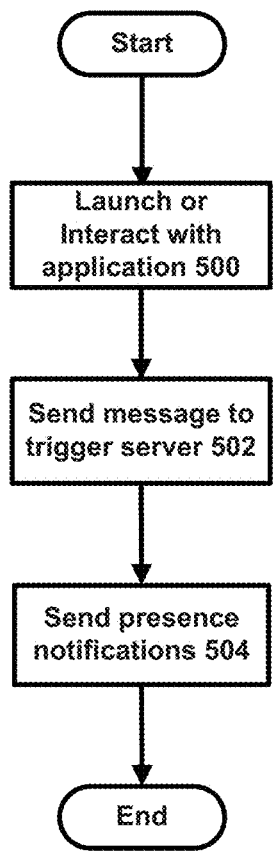
FIG. 5 is a flowchart that illustrates an optimization method using lazy presence updates.

FIG. 5 is a flowchart that further illustrates this optimization method using lazy presence updates.

Block 500 represents a user launching an application on the handset 134 for invoking an advanced voice service, or otherwise interacting with the application on the handset 134.

Block 502 represents the PoC Client 136, or the application itself, sending a message to the Presence Server 110 that triggers the Presence Server 110 in Block 504 to transmit the latest presence notifications being watched by the PoC Client 136, and optionally, triggers the Presence Server 110 in Block 504 to transmit the latest presence notifications for the PoC Client 136 itself.

CONCLUSION

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A system for providing communications services in a wireless communications network, the system comprising:
   one or more servers that interface to the wireless communications network to perform communications services for mobile units in the wireless communications network, wherein the communications services include a Push-to-Talk-over-Cellular (PoC) call session;
   wherein at least one of the servers switches voice messages for the communications services between the mobile units across the wireless communications network;
   wherein at least one of the servers manages the PoC call session by acting as an arbitrator for the PoC call session and controls sending of control messages and the voice messages to and from the mobile units; and
   wherein a first server of the one or more servers performs a notification delivery method, and wherein the notification delivery method comprises:
      maintaining an outgoing notification list comprising a plurality of notifications;
      delivering a first subset of the plurality of notifications to one or more first ones of the mobile units at a first point in time, wherein at the first point in time the outgoing notification list comprises the first subset of the plurality of notifications and a second subset of the plurality of notifications; and
      delaying delivery of the second subset of the plurality of notifications to one or more second ones of the mobile units until a second point in time after the first point in time by a time period.

2. The system of claim 1, wherein the time period is static or dynamically calculated by the first server.

3. The system of claim 1, wherein the outgoing notification list comprises a plurality of presence notifications.

4. The system of claim 1, further comprising updating notifications in the second subset of the plurality of notifications so that notifications containing out-of-date statuses are not delivered.

5. The system of claim 1, wherein delivering the first subset of the plurality of notifications comprises:
   delivering the first subset of the plurality of notifications to first mobile units served by a same cell or a same group of cells, wherein a first total number of the first mobile units is less than a threshold; and
   not delivering notifications to second mobile units served by the same cell or the same group of cells at the first point in time when a second total number of the first mobile units and the second mobile units is greater than the threshold.

6. The system of claim 5, wherein delivering the second subset of the plurality of notifications comprises delivering the second subset of the plurality of notifications to the second mobile units.

7. The system of claim 1, delaying delivery of the second subset of the plurality of notifications comprises delaying delivery of any notifications for a particular mobile unit until the particular mobile unit triggers the first server.

8. A method comprising:
   maintaining, by a server in a communications network, an outgoing notification list comprising a plurality of notifications;
   delivering, by the server, a first subset of the plurality of notifications to one or more first mobile units at a first point in time, wherein the plurality of notifications comprises the first subset and a second subset of the plurality of notifications at the first point in time;
   determining, by the server, a delay time period for delaying delivery of a second subset of the plurality of notifications to one or more second mobile units; and
   delivering of the second subset of the plurality of notifications to one or more second mobile units at a second point in time, wherein the second point in time is after the first point in time by the delay time period.

9. The method of claim 8, wherein the delay time period is static.

10. The method of claim 8, wherein determining, by the server, the delay time period comprises calculating the delay time period in accordance with an exponential formula, load conditions at the server, or a combination thereof.

11. The method of claim 8 further comprising:
    receiving, by the server, respective locations of each of the first mobile units and the second mobile units; and
    determining, by the server, third mobile units of the first mobile units and the second mobile units served by a same cell or a same group of cells.

12. The method of claim 11 further comprising throttling delivery of notifications to the third mobile units at the first point in time, the second point in time, or a combination thereof to fewer mobile units of the third mobile units than a threshold number of mobile units.

13. The method of claim 11, wherein receiving, by the server, the respective locations of each of the first mobile units and the second mobile units comprises receiving a mobile country code, a mobile network code, a location area code, a cell identifier, or a combination thereof from each of the first mobile units and the second mobile units.

14. The method of claim 11, wherein receiving, by the server, the respective locations of each of the first mobile units and the second mobile units comprises receiving the respective locations in dedicated messages for the respective locations.

15. The method of claim 11, wherein receiving, by the server, the respective locations of each of the first mobile units and the second mobile units comprises receiving the respective locations in login messages, session initiation protocol (SIP) messages, or a combination thereof.

16. The method of claim 8 further comprising:
receiving, by the server, a request from a fourth mobile unit to trigger the server to transmit notifications pending to be delivered to the fourth mobile unit, wherein the server does not send any notifications to the fourth mobile unit until the request is received; and
transmitting, by the server, the notifications pending to be delivered to the fourth mobile unit in accordance with the request.

17. The method of claim 16, wherein the fourth mobile unit transmits the request when a user invokes communications services, provided by a platform, on the fourth mobile unit, and wherein the platform comprises the server.

18. The method of claim 8, wherein the server is a component in a push-to-talk (PTT) platform comprising one or more servers providing PTT call sessions for the first mobile units and the second mobile units, and wherein the plurality of notifications comprise presence notifications.

19. A method comprising:
receiving, by a server in a communications services platform, location information regarding a plurality of mobile units in a network;
identifying, by the server, first mobile units of the plurality of mobile units served by a same cell or a same group of cells in the network;
throttling, by the server, delivery of a plurality of notifications within a first time period to the first mobile units, wherein throttling delivery of the plurality of notifications comprises:
delivering first notifications of the plurality of notifications to a fewer number of the first mobile units than a maximum number of mobile units; and
delaying delivery of second notifications of the plurality of notifications for an additional number of the mobile units until a second time period after the first time period.

20. The method of claim 19, wherein delaying delivery of the second notifications comprises not delivering out-of-date notifications.

21. The method of claim 19, wherein the communications services platform provides push-to-talk (PTT) call sessions to the plurality of mobile units in the network.

22. The method of claim 19, wherein the plurality of notifications comprises presence notifications.

23. The method of claim 19, wherein receiving, by the server, the location information the location information in dedicated messages, in login messages, a session initiation protocol (SIP) messages, or a combination thereof.

* * * * *